United States Patent [19]

DeWitt et al.

[11] Patent Number: 4,652,423

[45] Date of Patent: Mar. 24, 1987

[54] MAGNETIC INDUCED HEATING FOR FERRITIC METAL ANNEALING

[75] Inventors: Gregory L. DeWitt, Windsor Locks; Dennis J. Huber, Glastonbury, both of Conn.

[73] Assignee: Combustion Engineering, Inc., Windsor, Conn.

[21] Appl. No.: 659,736

[22] Filed: Oct. 11, 1984

[51] Int. Cl.$^4$ .............................................. G21C 9/00
[52] U.S. Cl. .................................... 376/277; 148/108; 148/134
[58] Field of Search ....................... 148/108, 154, 134; 376/142, 146, 277

[56] References Cited

U.S. PATENT DOCUMENTS 4,330,864 5/1982 Ohyabu .............................. 376/142

Primary Examiner—Deborah L. Kyle
Assistant Examiner—Richard W. Wendtland
Attorney, Agent, or Firm—John H. Mulholland

[57] ABSTRACT

A nuclear reactor vessel has an electromagnet positioned within to generate the predetermined temperature for the vessel wall for a predetermined time to anneal the vessel.

1 Claim, 1 Drawing Figure

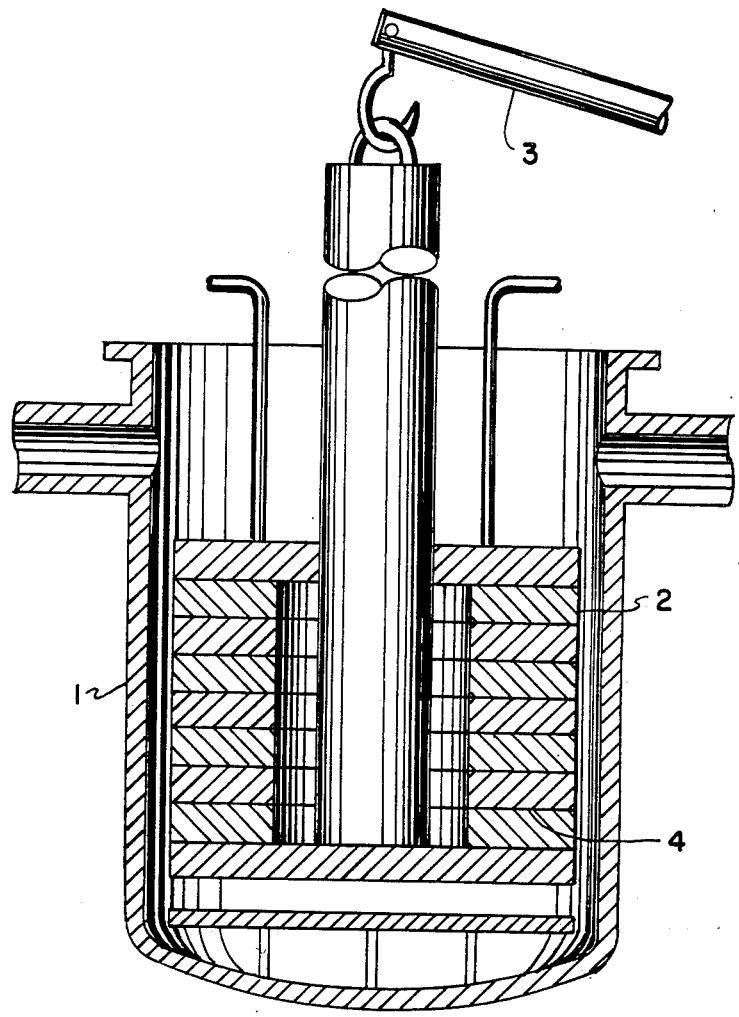

MAGNETIC INDUCED HEATING FOR FERRITIC METAL ANNEALING

TECHNICAL FIELD

The present invention relates to the use of electromagnetic energy to anneal a nuclear reactor vessel. More particularly, the invention relates to positioning an electromagnet within a nuclear reactor vessel to raise the vessel temperature and maintain the temperature for a predetermined time to anneal the vessel.

BACKGROUND ART

Pressurized Thermal Shock (PTS) is a safety issue receiving much attention by the NRC and other organizations in the nuclear industry. The problem is the loss of ductility in ferritic steel pressure vessels due to neutron irradiation over vessel life. The scenario of concern is a rapid cooldown due to an accident, possibly causing a crack in the pressure vessel due to thermal stresses induced by cold water coming in contact with the vessel wall. Subsequent repressurization of the vessel aggrevates the thermal-induced crack.

Within the pressure vessel's construction of particular concern are the weld areas which are most likely to suffer loss of ductility due to irradiation. Although a number of possible methods are being considered to prevent and/or mitigate PTS, vessel annealing is the only method of restoring ductility, thereby increasing PTS resistance for high embrittled vessels.

The annealing process involves heating the pressure vessel, and/or the area of concern in the vessel, up to 750° F.-800° and maintaining that temperature over a five-day period. A number of methods have been considered for annealing, such as: resistance heating, combustion heating, internal heated liquid, and external heated liquid. All these methods of vessel annealing have positive and negative aspects. One significant negative attribute in common with all these methods of annealing is that substantial radial temperature gradients will be induced across the vessel wall, despite the fairly good thermal conductivity of carbon steel (K-30 BTU/hr ft$^2$° F.).

A source of heat is needed with which to bring the pressure vessel up to the temperature required for annealing without the drawback described above.

DISCLOSURE OF THE INVENTION

The present invention contemplates elevating the temperature of a portion or all of a nuclear reactor pressure vessel by electromagnetic energy. The vessel to be annealed has its internals removed to allow an electromagnet to be positioned inside. The temperature of the vessel is elevated satisfactorily by the heat induced by the electromagnet. The desirable temperature of the vessel will be maintained for the time needed to anneal the ferritic steel of the vessel.

Other objects, advantages and features of this invention will become apparent to one skilled in the art upon consideration of the written specification, appended claim, and attached drawings.

BRIEF DESIGNATION OF THE DRAWING

The drawing is a sectioned elevation of a reactor vessel and electromagnet positioned to induce heat embodying the invention.

BEST MODE FOR CARRYING OUT THE INVENTION

The drawing discloses the shell 1 of a nuclear reactor vessel. The shell has developed loss of ductility which would deteriorate the reactor and ultimately cause a major accident. It has been established that the initial symptoms are often cracks in the vessel wall which can be obviated by annealing the vessel. It is now proposed to elevate the temperature of the vessel to a predetermined degree and maintain that temperature for a predetermined period of time. The present invention elevates the temperature of the reactor vessel by electromagnetic energy.

The present invention contemplates the use of an electromagnet 2 sized to heat the vessel wall uniformly. Magnet 2 is suspended from a crane 3 above. The electromagnet has a number of rings 4 which uniformly generate the heat in the vessel wall. With only inches difference in diameter between the magnet and the inside diameter of shell 1, the electromagnet is controlled by crane 3 for lowering it into the vessel and supporting it during the annealing process. Power supplied to magnet 3 will be projected into the vessel wall and generate the temperature necessary for annealing.

The physical process behind magnetic heating is as follows: pulsing a magnetic field causes the iron atom's orientation to follow the magnetic field lines. Reorienting the iron atom generates heat in the iron lattice within the steel of the reactor vessel wall. By oscillating the magnetic field, heat will be generated in the ferritic steel which comprises the pressure vessel. The amount and rate at which heat is generated in the metal can be controlled by the magnet's power and frequency.

After the reactor internals are removed and the vessel is dry, the magnet is placed inside. The position of the electromagnet would depend on the annealing requirements, the welds or seams are likely position candidates for the magnetic device. Any power source and coolant linkage terminate outside the pressure vessel for easy access and control.

The advantages of utilizing magnetic heating for the purpose of annealing include: (1) the equipment is designed for insertion within the pressure vessel; (2) the magnetic heating could be directed to areas of concern, i.e. weld regions; and (3) the vessel's wall would be heated uniformly, both radially and azimuthally. The magnetic field line strength is a function of distance, though over the thickness of the vessel wall heat generation would be nearly uniform.

From the foregoing, it will be seen that this invention is one well adapted to attain all the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A method for annealing the wall of a nuclear reactor vessel, including,
    positioning an electromagnet within a vertically positioned nuclear reactor vessel by lowering the electromagnet into the vessel,
    supplying power to the electromagnet to generate substantially uniform heat in the vessel wall,
    maintaining the power to the electromagnet for a predetermined length of time which will anneal the vessel wall, and removing the electromagnet.

* * * * *